United States Patent
Sherman

(10) Patent No.: US 9,930,902 B2
(45) Date of Patent: Apr. 3, 2018

(54) FROZEN ALCOHOL MAKER MACHINE

(71) Applicant: BEYOND ZERO, LLC, Miami, FL (US)

(72) Inventor: Jason Sherman, Miami, FL (US)

(73) Assignee: Beyond Zero, Inc., Louisville, KY (US)

( * ) Notice: Subject to any disclaimer, the term of this patent is extended or adjusted under 35 U.S.C. 154(b) by 363 days.

(21) Appl. No.: 14/661,897

(22) Filed: Mar. 18, 2015

(65) Prior Publication Data
US 2016/0270423 A1    Sep. 22, 2016

(51) Int. Cl.
*A23G 9/04*    (2006.01)
*C12G 3/00*    (2006.01)

(52) U.S. Cl.
CPC ............. *A23G 9/045* (2013.01); *C12G 3/005* (2013.01)

(58) Field of Classification Search
CPC ........ A23G 9/045; A23G 9/221; C12G 3/005; F25C 2400/08
USPC .............................................. 62/6, 340, 342
See application file for complete search history.

(56) References Cited

U.S. PATENT DOCUMENTS

| | | | | |
|---|---|---|---|---|
| 3,407,618 A | * | 10/1968 | Mullins, Jr. ............ | A23G 9/045 137/92 |
| 3,552,663 A | * | 1/1971 | Royals ................... | A23G 9/045 241/278.1 |
| 4,083,200 A | * | 4/1978 | Luxem .................... | A23G 9/045 366/286 |
| 4,189,063 A | * | 2/1980 | Matthiesen ............. | F25C 5/002 177/116 |
| 4,195,754 A | * | 4/1980 | Heier ...................... | A23G 9/045 222/146.6 |
| 4,332,485 A | * | 6/1982 | Woodman ............... | A23G 9/228 366/142 |
| 4,614,088 A | * | 9/1986 | Brooks ................... | F25C 5/185 62/137 |
| 4,653,281 A | * | 3/1987 | Van Der Veer ........ | A23G 9/045 366/144 |
| 4,681,030 A | * | 7/1987 | Herbert .................. | A23G 9/045 366/144 |
| 4,773,233 A | * | 9/1988 | Kawasumi ............... | A23G 9/12 62/340 |
| 5,363,746 A | * | 11/1994 | Gordon .................... | A23G 9/12 366/145 |
| 5,438,848 A | * | 8/1995 | Kim ........................ | A23G 9/12 62/342 |
| 5,603,229 A | * | 2/1997 | Cocchi ................... | A23G 9/045 366/144 |

(Continued)

*Primary Examiner* — Ljiljana Ciric
*Assistant Examiner* — Kirstin Oswald
(74) *Attorney, Agent, or Firm* — Christopher & Weisberg, P.A.

(57) ABSTRACT

At least one thermally conductive receptacle in thermal communication with the heat exchange engine, the thermally conductive receptacle is configured to receive and retain a volume of alcohol. The heat exchange engine is configured to extract heat from the thermally conductive receptacle and freeze solid the volume of alcohol when the volume of alcohol is received within the at least one thermally conductive receptacle. An extraction element is included and disposed within the housing, the extraction element configured to extract the frozen alcohol from the thermally conductive receptacle.

19 Claims, 6 Drawing Sheets

(56) References Cited

U.S. PATENT DOCUMENTS

| | | | | |
|---|---|---|---|---|
| 5,927,079 A * | 7/1999 | Sekiya | ............... | F25D 17/02 60/520 |
| 2003/0172658 A1* | 9/2003 | Yoshimura | ............... | F25B 9/14 62/6 |
| 2006/0175269 A1* | 8/2006 | Shima | ............... | B04B 3/04 210/787 |
| 2008/0041070 A1* | 2/2008 | Johnson | ............... | F25C 1/04 62/66 |
| 2010/0077773 A1* | 4/2010 | Sherman | ............... | F25C 1/00 62/66 |

* cited by examiner

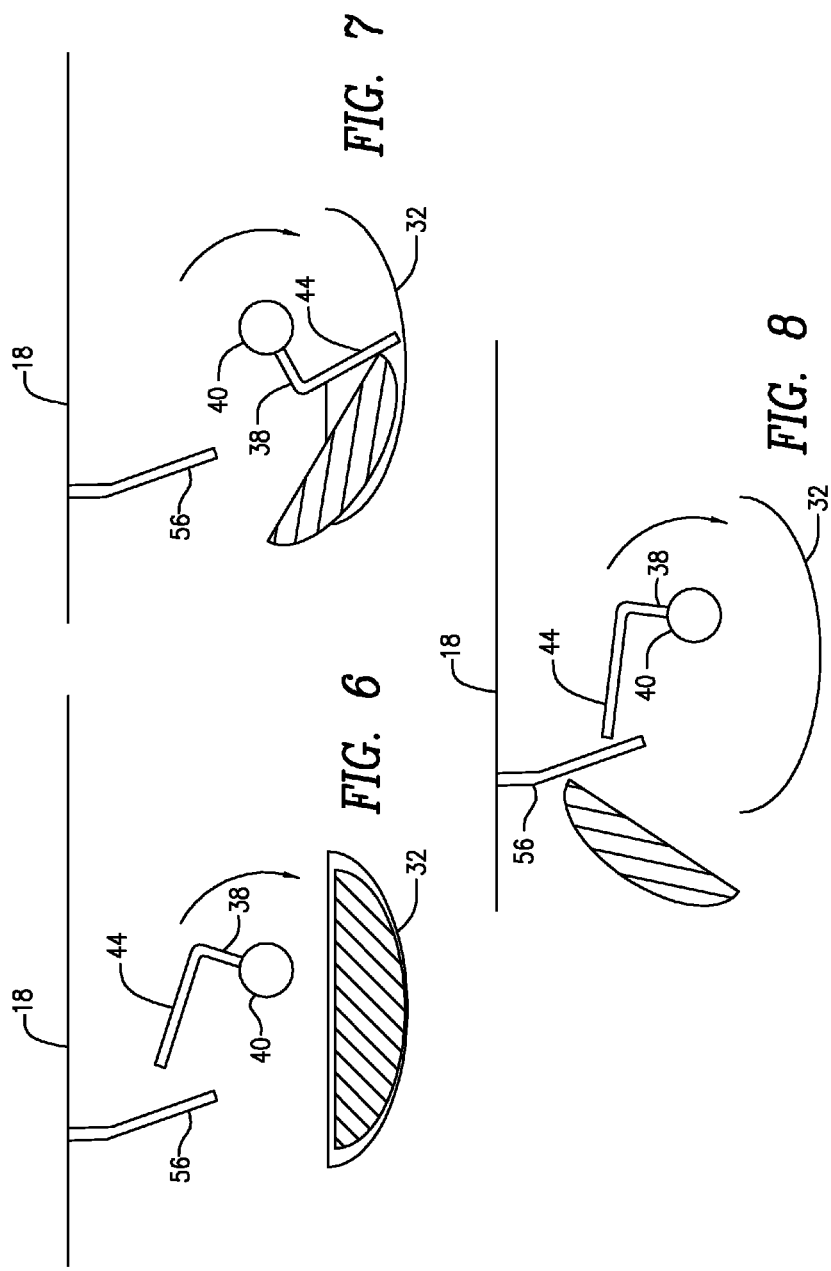

FROZEN ALCOHOL MAKER MACHINE

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to a device for the freezing of alcohol and in particular, a device for creating, extracting, and dispensing of frozen alcoholic beverages.

BACKGROUND OF THE INVENTION

The ability to serve a cold beverage has led to a century long revolution in the art of creating a cocktail. As bartenders began documenting recipes ice became an essential ingredient to mixology for its ability to cool a drink. As progressions in technology have happened consumers have developed preferences for the way a beverage is consumed. Specifically as to the cocktail evolution, language has been developed when ordering a drink to give a consumer control over the dilution factor of the alcohol beverage since there are few capable alternatives to water ice. Terms like Straight/Neat mean No Ice served in the beverage. "Shaken" means a mixed drink shook with Ice in a "shaker" then served. Some other options are Stirred Ice, Crushed Ice, Blended Ice, or Chipped Ice. The problem is, other than the Neat/Straight option each waters down the drink and changes the complexity of the spirit itself thereby leaving a gap by not giving the consumer a choice of something that is both pure and cool. Spirit companies go through great lengths to acquire water rights at particular sources due to the impact varying water has on the taste of the final product. Any foreign water or ice not from the alcohol distillery site changes the entire chemical make-up of the spirit resulting in a different taste altogether than the intention compounded by the issue that every different water source the ice is created from a different taste follows.

Ice has been used since the early 1800's to preserve medicine and food. However, as Fredrick Tudor revolutionized the "ice trade" it quickly spread to businesses and wealthy individuals. Soon ice became the essential ingredient to American mixology. However, as centuries of ice revolution continued attempts to create a frozen alcoholic beverage cube failed. Later ice trends aspired to create a frozen alcoholic ice cube but were often left with a "slushy" or blended drink partially frozen or excessive waste from the un-frozen product.

One problem in the current systems has been the inability to freeze alcoholic beverages containing ethanol into a frozen beverage cube. Indeed, traditional methods to prevent liquid from freezing have included ethanol as an additive ever since "antifreeze" was first conceived in the mid 1800's. This is so because ethanol has a freezing point of −114 degrees Celsius, which is significantly lower than the 0 degrees Celsius freezing point of water. However, attempts to freeze ethanol and serve it as an alcoholic beverage have failed because of its substantially cooler freezing point than water, coupled with a typical commercial and home freezer's capacity to only reach a temperature of −18 degrees Celsius or higher. The use of liquid nitrogen as a coolant to freeze alcohol, while sufficient to freeze liquid alcohol presents safety concerns in its use. In particular, alcohol frozen with liquid nitrogen may contain infused liquid nitrogen in the beverage, that when consumed and heated result in a phase change from liquid to gas which may rapidly expands in the stomach leading to gastrointestinal maladies.

SUMMARY OF THE INVENTION

The present invention advantageously provides for a device for freezing liquid alcohol. The device includes a housing and a heat exchange engine disposed within the housing. At least one thermally conductive receptacle is disposed within the housing and in thermal communication with the heat exchange engine, the thermally conductive receptacle is configured to receive and retain a volume of alcohol. The heat exchange engine is configured to extract heat from the thermally conductive receptacle and freeze solid the volume of alcohol when the volume of alcohol is received within the at least one thermally conductive receptacle. An extraction element is included and disposed within the housing, the extraction element configured to extract the frozen alcohol from the thermally conductive receptacle.

In another embodiment, the device includes a housing and a heat exchange engine disposed within the housing. A plurality of thermally conductive receptacles are disposed within the housing and are in thermal communication with the heat exchange engine, the plurality of thermally conductive receptacles are each configured to receive and retain a volume of liquid alcohol. The heat exchange engine is configured to extract heat from the plurality of thermally conductive receptacles and transform the volume of liquid alcohol into at least one of ice and a mixture of ice and liquid alcohol when the liquid alcohol is received within the plurality of thermally conductive receptacles. An extraction element is disposed within the housing, the extraction element includes a plurality of rotating teeth configured to dislodge the at least one of ice and a mixture of ice and liquid alcohol from the thermally conductive receptacles.

In yet another embodiment, the device includes a housing and a heat exchange engine disposed within the housing. A plurality of thermally conductive receptacles are disposed within the housing and in thermal communication with the heat exchange engine. The plurality of thermally conductive receptacles are each configured to receive and retain a volume of liquid alcohol. The heat exchange engine is configured to extract heat from the plurality of thermally conductive receptacles and transform the volume of liquid alcohol into at least one of ice and a mixture of ice and liquid alcohol when the liquid alcohol is received within the plurality of thermally conductive receptacles. An extraction element is disposed within the housing and positioned proximate the plurality of thermally conductive receptacles. The extraction element includes a plurality of rotating teeth configured to dislodge the at least one of ice and a mixture of ice and liquid alcohol from the thermally conductive receptacles. The extraction element includes a shaft rotatably coupled to and disposed within the housing proximate the plurality of thermally conductive receptacles. The plurality of rotating teeth are coupled to the shaft. A plurality of prongs are coupled to the plurality of thermally conductive receptacles. The plurality of prongs are configured to force at least one of the ice and a mixture of ice and liquid into the funnel, one of the plurality of prongs being sized to be received within one of the plurality of teeth. A funnel is coupled to the housing and disposed proximate the plurality of thermally conductive receptacles. The funnel is configured to receive the dislodged at least one of ice and a mixture of ice and liquid alcohol from the at least one thermally conductive receptacle. An actuator coupled to the housing is included, the actuation of the actuator causing rotation of the extraction element.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 6 is a front cross-sectional view of the receptacle shown in FIGS. 4 and 5 with frozen alcohol disposed within and the teeth of the extraction element positioned above the receptacles;

FIG. 7 is a front cross-sectional view of the receptacle shown in FIGS. 4 and 5 with frozen alcohol disposed within and the teeth of the extraction element positioned within the receptacles; and FIG. 8 is a front cross-sectional view of the receptacle shown in FIGS. 4 and 5 with frozen alcohol dislodged from the receptacle.

DETAILED DESCRIPTION OF THE INVENTION

As used here, relational terms, such as "first" and "second," "top" and "bottom," "front and rear," and the like, may be used solely to distinguish one entity or element from another entity or element without necessarily requiring or implying any physical or logical relationship or order between such entities or elements.

Figure 1:
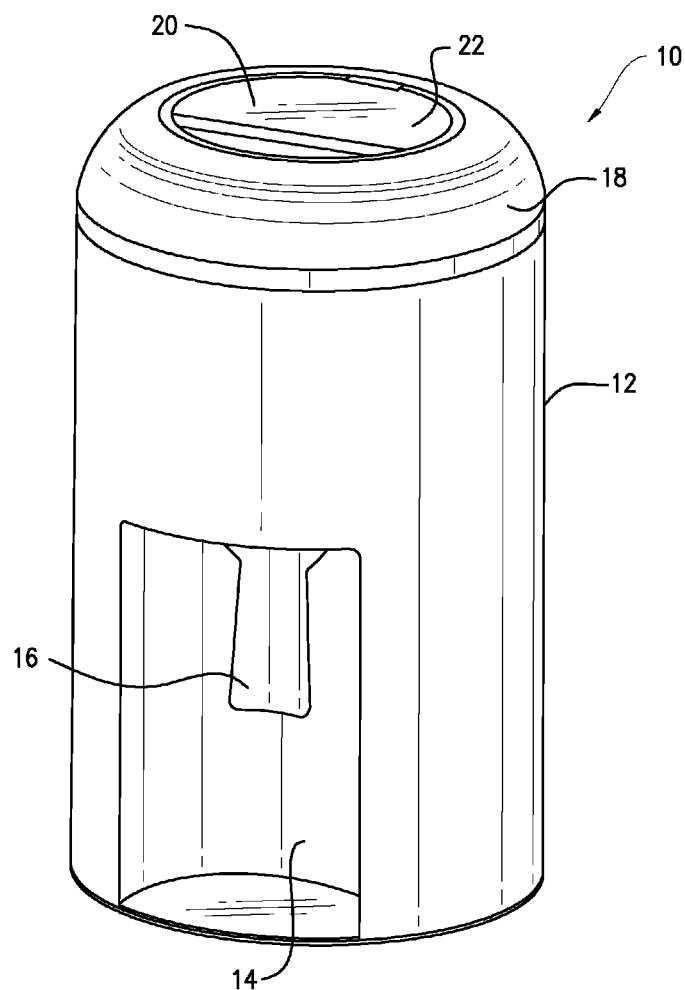
FIG. 1 is a front perspective view of an embodiment of a frozen alcoholic beverage maker device constructed in accordance with the principle of the present invention.

Now referring to the drawings in which like reference designators refer to like elements, there is shown in FIG. 1 a frozen alcoholic beverage maker device constructed in accordance with the principles and designated general as "10." The device 10 may include a housing 12 in which the components of the device 10 are included. The housing 12 may be composed of a rigid material, for example, plastic, metal, or a metallic alloy, or a resilient material, such as polyurethane, and may further be composed of an insulated material to minimize thermal transfer and to maintain the temperature of the housing 12 at approximately room temperature. The housing 12 may be any shape or size, and in an exemplary configuration, is substantially cylindrical or rectangular in shape. A power port and plug (not shown) may be included on the housing 12 configured to receive electrical power from a power source such as A/C current from a wall outlet. A recess 14 may be included in the housing 12 defining a volume in which the user of the device 10 may place a cup or a bucket for receiving the frozen or partially frozen alcohol of the device 10.

Disposed within the recess 14 and movably coupled to the housing 12 may be an actuator 16. The actuator 16 may be pivotally coupled to the housing 12 and may be in mechanical and/or electrical communication with other components in the device 10, as discussed in more detail below. The actuator 16 is configured to initiate the dispensing of at least one of a frozen solid alcoholic beverage and a mixture of liquid alcohol and frozen solid alcohol, commonly referred to as slush or slushee, from the device 10.

The housing 12 may further include a lid 18 disposed at the top of the housing 12. The lid 18 may be opaque, translucent, or transparent, and may be movably and/or pivotally coupled to the housing 12. The lid 18 may be substantially annular in shape, or any shape, and is sized to either allow or prevent access to the interior components of the device 10. Optionally, the lid may include a hatch 20 sized to be received within an opening 22 defined by the lid 18. In such a configuration, the hatch 20 may be pivotally coupled to the lid 18 such that it pivots from a closed position to an open position to allow for the introduction of alcohol into the device 10 from the ambient environment while the device 10 is activated or de-activated. In other configurations, the hatch 20 is removeably insertable within the opening 22 and my further define a tapered shaft 24 such as a funnel with an aperture configured to direct the flow of alcohol downward from the opening 22. In yet another configuration, the lid 18 may be provided with a visual indicator, for example, LED lighting that indicates device 10 status information to the user, for example, when the device 10 is on or off, ready to dispense e ice, when the device is cooling the alcohol, etc.

Figure 2:
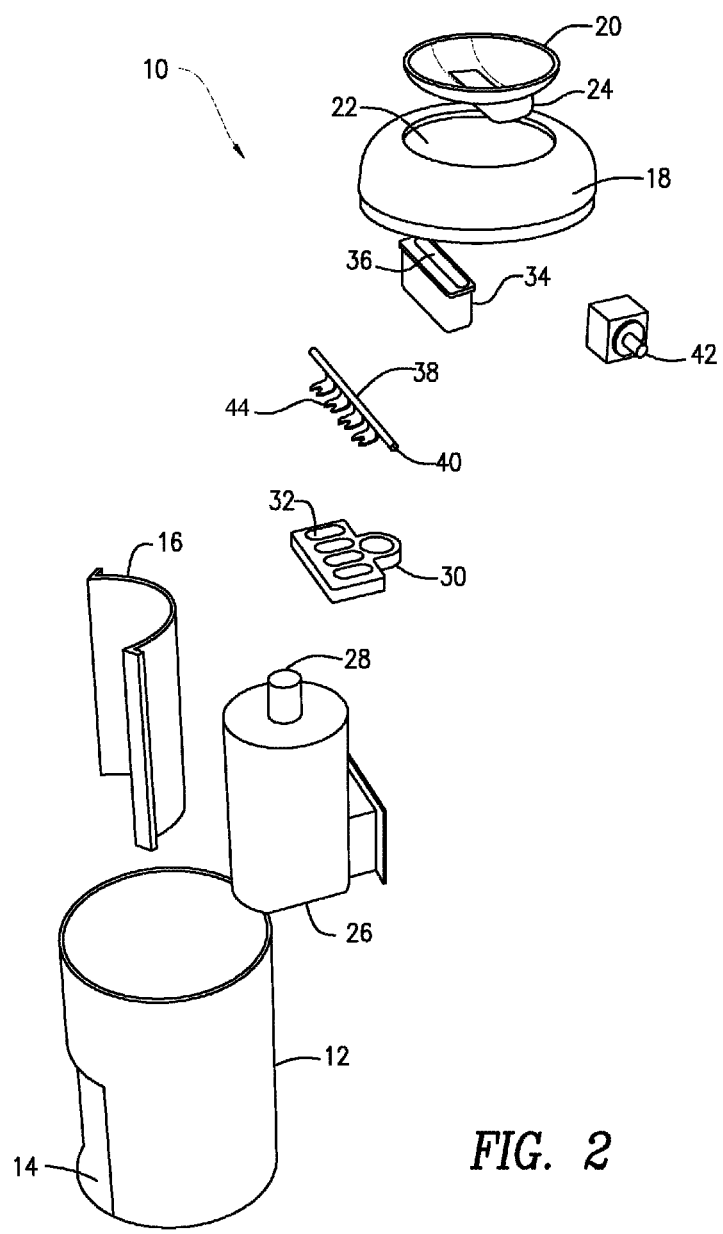
FIG. 2 is an exploded view of the frozen alcoholic beverage maker device of FIG. 1.

Referring now to FIG. 2, disposed within the housing 12 may be a heat exchange engine 26. The heat exchange engine 26 may be, for example, a Stirling engine, or other heat exchange engines or heat pumps known in the art for actively extracting heat from one location and transferring it to another location away from the device 10, for example, thermosiphons, compressors, or chemical based thermal exchange devices. In an exemplary configuration, the heat exchange engine 26 is an 80W free piston Stirling motor, which is configured to freeze solid up to approximately two fluid ounces of between 80 and 120 proof alcohol in approximately two to nine minutes is insertable within the housing 12 and substantially cylindrical in shape. The heat exchange engine 26 includes a thermal exchange element 28, which is in thermal communication with a tray 30, the tray 30 including at least one of thermally conductive receptacle 32. In particular, the thermal exchange element 28 may protrude a distance away from a cylindrical portion of the heat exchange engine 26, or alternatively the thermal exchange element 28 may be substantially flush with the heat exchange engine 26 and with the tray 30. During operation of the heat exchange engine 26, the thermal exchange element 28 becomes cold as heat is extracted. In particular, the heat exchange engine 26 is configured to lower the temperature of the heat exchange element 28 and the tray 30 to between −100° C. and −25° C. The thermally conductive tray 30, which may be composed of a rigid metal, metal alloy, or any rigid conductive element, such as aluminum, copper, stainless steel, and like alloys, may be placed in thermal communication with the thermal exchange element 28. For example, the tray 30 may define an aperture 33 sized to receive the thermal exchange element 28 such that during operation, the thermal exchange element 28 extracts heat from the thermally conductive tray 30. The tray 30 may be fixed to the heat exchange engine 26 by the thermal exchange element 28, or alternatively, be rotatable coupled to the heat exchange engine 26 such that it is movable and removeable. For example, the tray 30 may be releasably insertable within the housing 12 such that it can be removed for cleaning, or alternatively, different sized trays being be releasably engaged within the housing 12. In other configurations, a thermally conductive adaptor (not shown) may be disposed between the tray 30 and the thermal exchange element 28 to act as an intermediary to transfer heat from the tray 30. The tray 30 may be sufficiently thick, for example, approximately between one half inch thick and two inches, such that heat transfer between the liquid alcohol disposed within the tray 30 freezes rapidly by conduction. In particular, prior art ice makers use thin-walled dividers in the ice tray to form a mold for the liquid to freeze solid. However, these thin-walled molds are too thin to transfer heat by conduction and the liquid within the molds freezes by convection of cold blowing air. In order to freeze solid alcohol by conduction, the tray 30 rapidly cools and in order to freeze the alcohol within. Thus, the use of a thick tray 30 is contemplated to transfer heat efficiently and rapidly.

Continuing to refer to FIG. 2, in an exemplary configuration the tray 30 includes four thermally conductive receptacles 32 each sized to receive and retain about 0.25 fluid ounces of liquid alcohol, for a total of one fluid ounce collectively from all four receptacles 32, although any number of receptacles 32 and any size of the receptacles 32 is contemplated. Each of the receptacles 32 may be concave in shape and define a smooth surface which facilitates the dislodging of ice frozen in the receptacles. For example, the receptacles 32 may define a crescent or half-moon shape, which may prevent the cracking and chipping of the receptacles 32 when the contents within are removed and so that the volume of the contents is substantially the same as the volume of the receptacles 32. Each of the receptacles 32 may receive alcohol in series from, for example, a bottle of alcohol being pouring into the each receptacle 32 from outside the device 10, or alternatively, may be simultaneously receive a volume of alcohol as the alcohol is poured into the housing through the lid 18. For example, in one embodiment, the housing 12 includes a measuring pourer 34 configured to deliver a pre-determined amount of alcohol to one or more of the receptacles 32 simultaneously. In particular, the measuring pourer 34 may include a reservoir sized to retain a fixed amount of fluid and controllable deliver the retained alcohol to the one or more of the receptacles 32. The controlled delivery of alcohol operates to prevent an over flow of alcohol into the receptacles 32, which may delay freezing times and expose other components in the device to alcohol, and further operates to count the number of frozen alcohol cubes or other shapes dispensed from the device 10, thus controlling waste and volume of alcohol. Moreover, the measuring pouring 34 may further define an opening 36 sized to receive alcohol, but small enough to prevent the user's fingers from touching the receptacles 32. Thus, the measuring pourer 34 is further configured as a safety mechanism to prevent the user's fingers from contacting with the cold tray 30 or the other components of the device 10.

The device 10 may include an extraction element 38 disposed with the housing 12. The extraction element 38 is configured to dislodge at least one of the frozen solid alcohol and a mixture of frozen solid alcohol and liquid alcohol from one or more of the receptacles 32. The extraction element 38 may be mechanically or electrically coupled to the actuator 16 such that actuation of the actuator causes activation of the extraction element 38. As shown in FIG. 2, the extraction element 38 may include an elongate shaft 40 rotatably coupled to a motor 42. The motor 42 may be in electrical communication with the power source and the actuator 16 such that actuation of the actuator causes rotation of the motor 42. The motor 42 may be coupled to the interior of the housing 12 and may be positioned proximate the tray 30. In a particular configuration, the motor 42 is positioned above the tray 30 and the receptacles 32 such that the shaft 40 extends from the motor 42 superjacent to the receptacles 32. Coupled to the shaft 40 may be one or more teeth 44 configured to dislodge at least one of the frozen solid alcohol and a mixture of frozen solid alcohol and liquid alcohol from one or more of the receptacles 32. Each tooth 44 may be sized to be received within one receptacle 32. In particular, each tooth 44 may define substantially the same curvature to that of its corresponding receptacle 32. Moreover, each tooth 44 may define a length and a width approximately commensurate with that of its corresponding receptacle 32. In particular, each tooth 44 be slightly smaller than its corresponding receptacle 32 as to facilitate its movement into and out each receptacle 32. In an exemplary configuration, the teeth 44 are affixed to the shaft 40, and in other configurations, the teeth 44 may be movable coupled to the shaft 40 or releasably coupled to the shaft 40. The teeth 44 may be composed of a metal, metal alloy, plastic or other materials or coating sufficient to glide on the interior surface of each receptacle 32 and scoop out the contents of the receptacles 32. In an exemplary configuration, the shaft 40 and the teeth 44 may rotate in the range of 0 degrees to 360 degrees above the receptacles 32.

Figure 3:
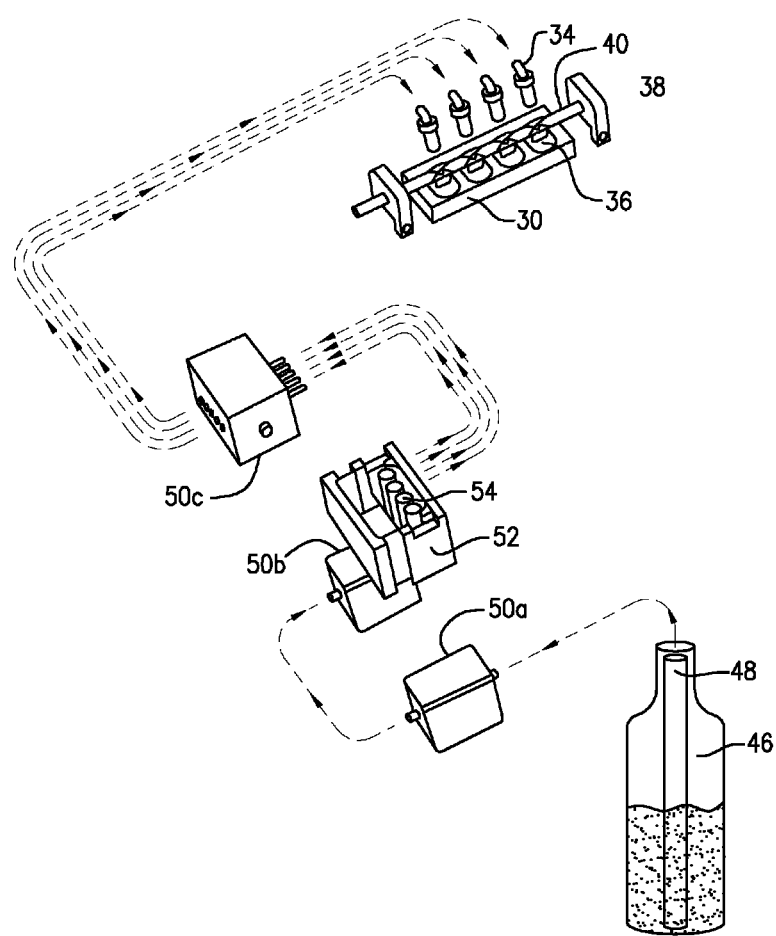
FIG. 3 is a component view of an interior portion of an embodiment of a frozen alcoholic beverage maker device constructed in accordance with the principle of the present invention and a bottle of alcohol.

Referring now to FIG. 3, a bottle of alcohol 46 may be disposed within the housing 12, or in fluid communication with the housing 12 through a siphon 48 disposable within the bottle 46. For example, the bottle of alcohol 46 may be received within recess 14 or proximate the housing 12. In such configurations, pumps 50*a*, 50*b*, and 50*c* may be included in the housing 12 to actively siphon a predetermined or continuous volume of alcohol from the bottle 46 to a reservoir 52 disposed within the housing 12. In particular, pump 50*a* may be configured to actively siphon a volume of alcohol from the bottle 46 to the reservoir 52 where the alcohol may be kept refrigerated or at room temperature depending on the type of alcohol in the bottle 46. The reservoir 52 may define one or more cavities 54 in which a predetermined amount of alcohol is stored, for example, one fluid ounce or alcohol or one shot. The cavities 54 may be visible from outside of the housing 12 such that a user can view the alcohol being selected for freezing, for example, one shot, which provides for an enhanced user experience as well as control in the amount of alcohol being frozen. It is further contemplated that the reservoir 52 or the housing 12 may include one or more controls (not shown) configured to activate pump 50*b* such that the alcohol is actively siphoned from reservoir 52 into one or more of the cavities 54. Alternatively, pump 50*b* may be activated contemporaneously with pump 50*a* such that the flow of alcohol into the cavities is substantially continuous from the bottle 46 to the cavities 54. Pump 50*c* may be activated to actively siphon the alcohol from the one or more cavities 54 into directly into at least one of the receptacles 32 and optionally into the measuring pourer 34 if included. The pumps 50 may thus provide for continuous flow of fluid into the receptacles 32 to be cooled without the need for pouring alcohol into the receptacles 32 directly.

Figure 4:
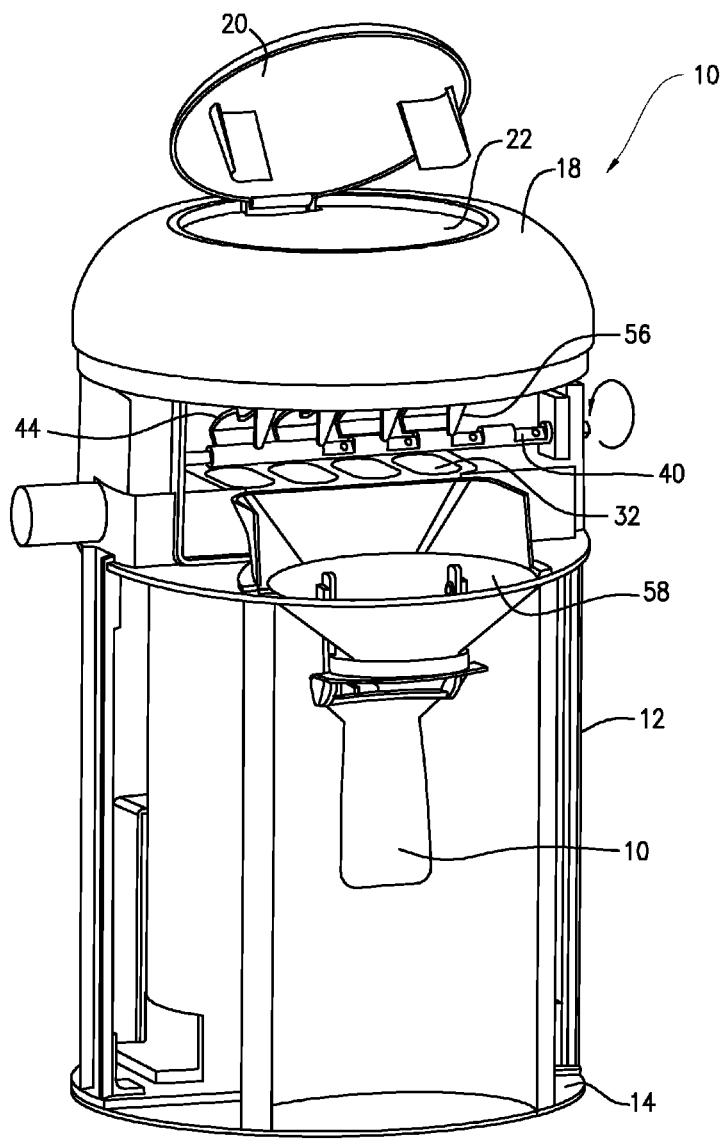
FIG. 4 is a front perspective of the frozen alcoholic beverage maker device of FIG. 1 with the housing removed.
Figure 5:
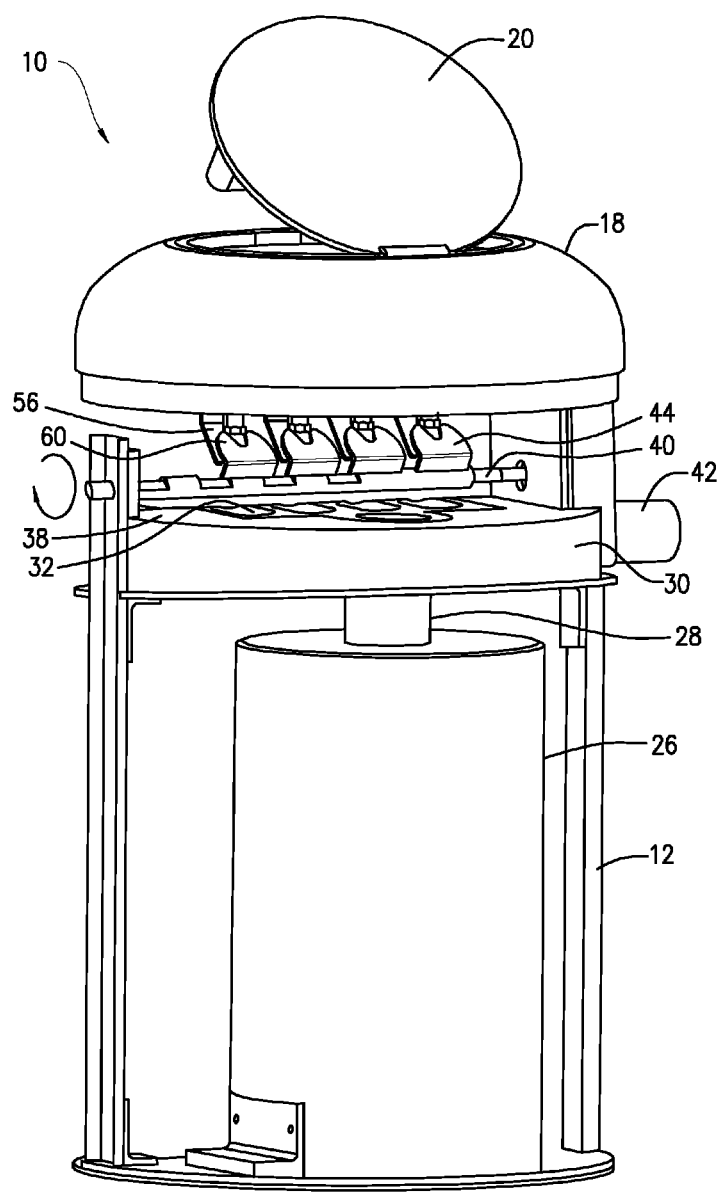
FIG. 5 is a rear perspective view of the frozen alcoholic beverage maker device of FIG. 1 with the outer housing removed.

Referring now to FIGS. 4 and 5, affixed to the housing 12 may be one or more prongs 56 configured to dislodge at least one of the frozen solid alcohol and/or the mixture of liquid alcohol and frozen solid alcohol from the teeth 44. In one embodiment, the prongs 56 extend downward from the lid 18 and are positioned anteriorly to the receptacles 32. In other embodiments, the prongs 56 may be coupled directly to the tray 30 or to a funnel 58 disposed beneath the tray 30 configured to channel the extracted frozen solid alcohol and/or liquid out of the housing 12 for collection. In the configuration shown in FIGS. 4 and 5, the prongs 56 extend downward from the lid 18 at an oblique angle, but may extend downward at any angle. The prongs 56 may have a tapered width such that the width of the prongs 56 is wider at the junction between the prongs 56 at the housing 12 and narrower toward their distal ends. In an exemplary configuration, each prong 56 is sized to be received within a portion of each tooth 44 such that frozen alcohol may be dislodged from the tooth 44. For example, as shown in FIG. 5, each tooth 44 defines a slot 60 sized to receive at least a portion of one of the prongs 56. In particular, each tooth 44 may define the slot 60 such that the slot 60 and its corresponding prong 56 are substantially co-extensive when the tooth 44 is rotated a predetermined distance. In one configuration, each tooth 44 may be substantially co-planar with its corresponding prong after ice is dislodged from the tooth 44 as discussed in more detail below.

The housing 12 may include one or more sensors (not shown) with a visual or audio indicator (not shown) to indicate when the alcohol is sufficiently frozen for extraction. For example, a temperature sensor may be included with each receptacle 32 to indicate when the temperature each receptacle 32 reaches a predetermined temperature, for example, −40° C. Upon reaching the desired temperature, the extraction element 38 may, in some configuration, automatically begin rotating to dislodge the frozen alcohol and/or the mixture of frozen alcohol and liquid alcohol from the receptacles 32 without manually actuating the actuator. In other configurations, no temperature sensor is included, but rather an optical sensor is included (not shown) to indicate the presence of alcohol with the receptacles 32. In such a configuration, the extraction element 38 may automatically begin to extract the frozen alcohol and/or the mixture of frozen alcohol and liquid alcohol after a predetermined amount of time, for example seven minutes after the alcohol is received within the receptacles 32 and detected by the optical sensor. In other configurations, no sensors are included and the extraction element 32 may be activated by actuation of the actuator 16, or alternatively, may be activated remotely through one or more remote controllers (not shown) or through a mobile application in communication with the housing 12 and the extraction element 32. For example, the housing 12 may include a control panel with a wireless signal receiver in any of the above configurations, and in particular, in the configuration including multiple pumps 50. It is contemplated that a user interaction with a mobile application may activate the pumps 50a-c to load alcohol into the receptacles and activate the extraction element 38.

Referring now to FIGS. 6-8, in an exemplary extraction of frozen alcohol and/or a mixture of frozen alcohol and liquid alcohol, liquid alcohol may be received within one or more of the receptacles 32 where it exchanges heat with the thermally conductive tray 30. When the frozen alcohol extraction process is initiated by any of the above method discussed above, the shaft 40 may rotate about a major longitudinal axis defined by the shaft 40. In an exemplary configuration, the motor 42 rotates the shaft 40 clockwise although any direction of rotation is contemplated. As the teeth 44 are rotated toward the concave receptacles 32, the distal end of the teeth 44, which may be rounded and sized to contour the surface of the receptacles 32, pushes and/or scoops the frozen alcohol from the receptacle 32. For example, the distal end of each tooth 44 may be arcuate in shape to substantially match the arcuate shape of the receptacles 32. As the teeth 44 continue to rotate, the frozen alcohol and/or mix of frozen alcohol and liquid alcohol may be scooped out from the receptacles 32 and may be lifted by the teeth 44 as the teeth 44 rotate toward the prongs 56. The frozen alcohol may extend a distance away from the distal end of the teeth 44 as the frozen alcohol is scooped by the teeth 44. As the teeth 44 approach the prongs 56, the frozen alcohol disposed on the surface of the teeth 44 contacts the prongs 56 which pushes the frozen alcohol off of the teeth 44 in the opposite direction of the rotation of the teeth 44, toward the funnel 58 and out of the device for consumption. In other configurations, the teeth 44 move back and forth in a sweeping motion to dislodge the contents of the receptacles 32.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A device for freezing liquid alcohol, comprising: a heat engine; at least one thermally conductive receptacle being affixed to the heat engine, the thermally conductive receptacle configured to receive and retain a volume of alcohol, the heat engine configured to extract heat from the thermally conductive receptacle by conduction and freeze solid the volume of alcohol when the volume of alcohol is received within the at least one thermally conductive receptacle; an extraction element configured to extract the frozen alcohol from the thermally conductive receptacle; and wherein the extraction element includes a plurality of teeth configured to dislodge the frozen alcohol from the at least one thermally conductive receptacle.

2. The device of claim 1, further including a housing, and wherein the heat engine is a Stirling engine disposed within the housing.

3. The device in claim 1, wherein the at least one thermally conductive receptacle is composed of at least one of a rigid metal and rigid metal alloy.

4. The device in claim 1, further including a rigid thermally conductive tray in thermal communication with the heat engine, the tray having a thickness between one half inch and two inches, and wherein the tray defines the at least one thermally conductive receptacle.

5. The device of claim 4, wherein the extraction element includes at least one prong configured to force the extracted frozen alcohol toward a funnel.

6. The device in claim 5, wherein the at least one prong is sized to be received within a portion of one of the plurality of teeth.

7. The device of claim 1, wherein the housing includes an actuator, and wherein actuation of the actuator activates the extraction element.

8. The device of claim 1, wherein the heat engine is configured to lower the temperature of the thermally conductive receptacle to a temperature within the range of negative 25 degrees Celsius to negative 85 degrees Celsius.

9. The device in claim 1, wherein the heat engine is configured to freeze a volume of approximately between one fluid ounces and two fluid ounces of alcohol within the at least one thermally conductive receptacle.

10. The device of claim 1, wherein the extraction element rotates above the at least one thermally conductive receptacle.

11. A device for freezing liquid alcohol, comprising:
a housing;
a heat engine disposed within the housing;
a rigid and thermally conductive tray defining a plurality of thermally conductive curved receptacles disposed within the housing and affixed to the heat engine, the plurality of thermally conductive receptacles each configured to receive and retain a volume of liquid alcohol, the heat engine configured to extract heat from the plurality of thermally conductive receptacles by conduction and transform the volume of liquid alcohol into at least one of frozen alcohol and a mixture of frozen alcohol and liquid alcohol when the volume of liquid alcohol is received within the plurality of thermally conductive receptacles; and
an extraction element disposed within the housing, the extraction element including a plurality of rotating teeth configured to dislodge the at least one of ice and a mixture of ice and liquid alcohol from the thermally conductive receptacles.

12. The device of claim 11, wherein the heat engine is a Stirling engine.

13. The device of claim 11, wherein the extraction element includes a shaft rotatably coupled to and disposed within the housing proximate the plurality of thermally conductive receptacles, and wherein the plurality of rotating teeth are coupled to the shaft.

14. The device of claim 11, further including a funnel disposed within the housing and disposed proximate the plurality of thermally conductive receptacles.

15. The device of claim 14, further including a plurality of prongs affixed to at least one of the plurality of thermally conductive receptacles and the extraction element, the plurality of prongs configured to force at least one of the frozen alcohol and a mixture of frozen alcohol and liquid into the funnel.

16. The device of claim 15, wherein one of the plurality of prongs is sized to be received within a portion of one of the plurality of teeth.

17. The device of claim 11, wherein the extraction element rotates above the plurality of thermally conductive receptacles.

18. The device of claim 11, further including an actuator coupled to the housing, and wherein actuation of the actuator causes rotation of the extraction element.

19. A device for freezing liquid alcohol, comprising:
a housing;
a heat engine disposed within the housing;
a rigid and thermally conductive tray having a thickness between approximately one half inch and one inch thick, the tray defining a plurality of curved thermally conductive receptacles disposed within the housing, the tray configured to receive and to affix to at least a portion of the heat engine, the plurality of thermally conductive receptacles each configured to receive and retain a volume of liquid alcohol, the heat engine configured to extract heat from the plurality of thermally conductive receptacles by conduction and transform the volume of liquid alcohol into at least one of ice and a mixture of ice and liquid alcohol when the volume of liquid alcohol is received within the plurality of thermally conductive receptacles;
an extraction element disposed within the housing and positioned proximate the plurality of thermally conductive receptacles, the extraction element including a plurality of rotating teeth configured to dislodge the at least one of frozen alcohol and a mixture of frozen alcohol and liquid alcohol from the thermally conductive receptacles, the extraction element including a shaft rotatably coupled to and disposed within the housing proximate the plurality of thermally conductive receptacles, and the plurality of rotating teeth being coupled to the shaft;
a plurality of prongs coupled to housing, the plurality of prongs configured to force at least one of the frozen alcohol and a mixture of frozen alcohol and liquid alcohol into a funnel, one of the plurality of prongs being sized to be received within one of the plurality of teeth;
the funnel being coupled to the housing and disposed proximate the plurality of thermally conductive receptacles, the funnel configured to receive the dislodged at least one of frozen alcohol and a mixture of frozen alcohol and liquid alcohol from the at least one thermally conductive receptacle; and
an actuator coupled to the housing, the actuation of the actuator causing rotation of the extraction element.

* * * * *